Jan. 5, 1932.  G. A. SALZGEBER  1,840,133
MAGNETIC COMPASS

Original Filed Sept. 15, 1927    2 Sheets-Sheet 1

Inventor.
Gustave A. Salzgeber
by Heard Smith & Tennant.
Attys.

Jan. 5, 1932.  G. A. SALZGEBER  1,840,133
MAGNETIC COMPASS
Original Filed Sept. 15, 1927  2 Sheets-Sheet 2
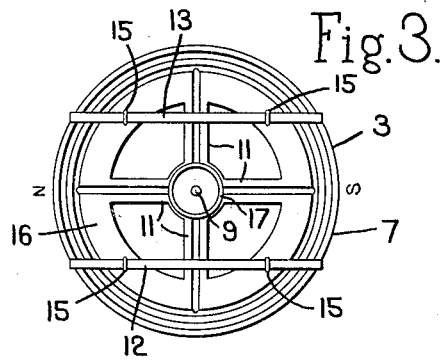
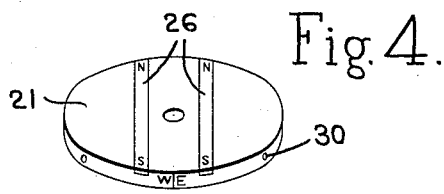
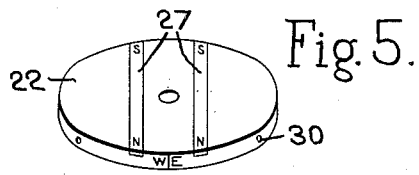
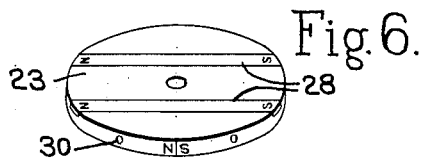
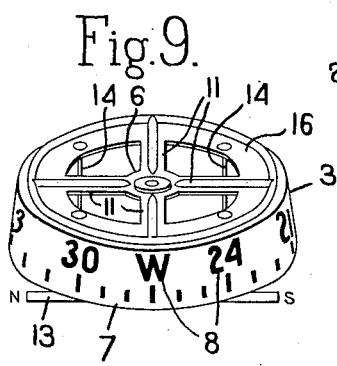
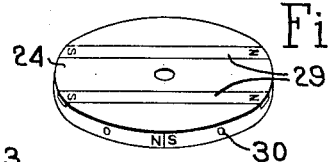
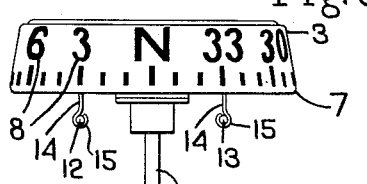
Inventor.
Gustave A. Salzgeber
by Heard Smith & Tennant.
Attys.

Patented Jan. 5, 1932

1,840,133

UNITED STATES PATENT OFFICE

GUSTAVE A. SALZGEBER, OF EAST MILTON, MASSACHUSETTS

MAGNETIC COMPASS

Application filed September 15, 1927, Serial No. 219,633. Renewed May 18, 1931.

This invention relates to magnetic compasses and it has for one of its objects to provide improvements for adjusting the compass to compensate for deviations in the compass needle due to local attraction.

In order to give an understanding of the invention I have illustrated in the drawings a selected embodiment thereof which will now be described after which the novel features will be pointed out in the appended claims.

In the drawings, Fig. 1 is a front view of a compass embodying my invention;

Fig. 3 is a bottom plan view of the compass card;

Figs. 4, 5, 6 and 7 are views of the compensating disks;

Fig. 8 is a side view of the compass card, and

Fig. 9 is a perspective view thereof.

Figure 1:
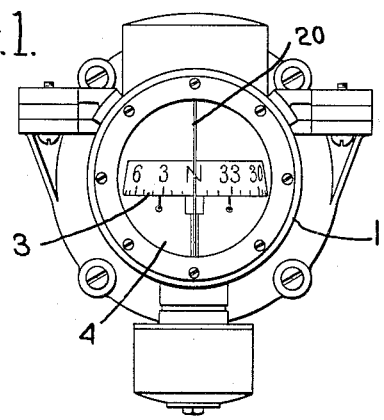
Figure 2:
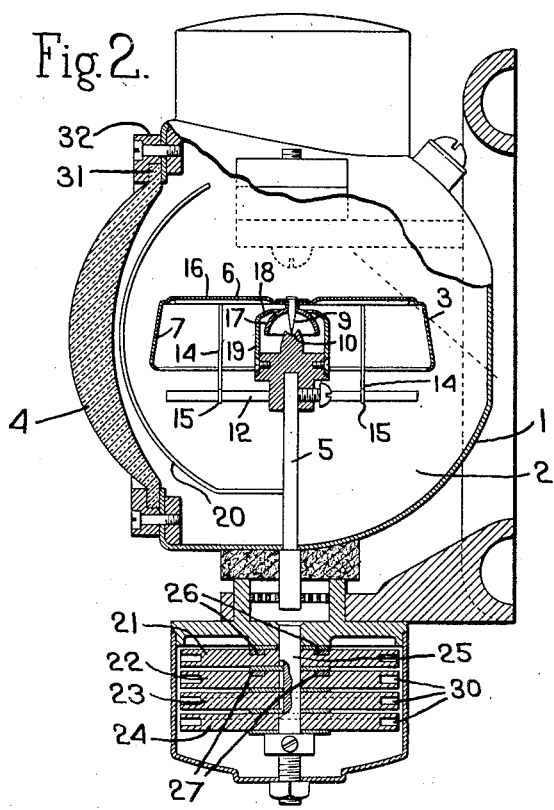
Fig. 2 is an enlarged part sectional view of the compass.

The compass herein shown comprises a casing 1 which may have any desirable shape and which is provided with a chamber 2 which is filled with some suitable liquid such as alcohol or kerosene and within which is received the compass card indicated generally at 3. The casing is open at one side and this opening is closed by a glass member 4 through which the compass card 3 is visible. This glass member 4 is in the nature of a hollow bull's eye and thus has marked magnifying properties. It is formed with the convex outer surface and the concave inner surface, the curvatures of the two surfaces being different to produce the lens effect. The glass may be retained in position in any suitable way and is herein shown as being formed with a peripheral flange 31 which is engaged by the clamping ring 32. The flange 31 has opposed flat faces which are in planes at right angles to the axis of the glass and these flat faces rest against corresponding flat faces on the casing and clamping ring 32. Hence when the clamping ring is tightened and pressure against the glass is perpendicular to the flat face and the advantage of this is that the tightening of the clamping ring is less likely to crack the glass than if the pressure is applied to the glass at an angle to the surface.

The card 3 and the magnetic elements by which it is controlled are pivotally supported upon a post 5 rising from the bottom of the casing 1. The card is preferably made of sheet material and is formed with the central spider portion 6 and with a depending peripheral skirt portion 7 on which the graduations 8 are imprinted. The spider portion 6 has a pivot 9 depending from its central portion, said pivot resting on a seat 10 formed in the upper end of the post 5. The arms 11 of the spider 6 are preferably ribbed in order to stiffen the structure and the skirt 7 and spider 6 are integral with each other, the entire card 3 being formed from a single piece of metal by means of suitable dies.

The magnetic elements are indicated at 12 and 13. Each element is hung from the spider portion 6 of the card by means of suitable wires 14, said wires having loops 15 at their lower ends in which the magnetic elements are received and being secured at their upper ends to the rim portion 16 of the spider in any appropriate way. The spider is provided with a depending bell-shaped flange 17 which fits within a retaining flange 19 carried by the post 5. The upper end of the flange 19 is bent inwardly at 18 to embrace the bell-shaped flange 17, this forming a sort of ball and socket connection which will permit the card to have free movement on its pivot but which will prevent the card from being separated from the post.

20 indicates the usual stationary indicating finger which is herein shown as rigidly secured to the post 5, said finger furnishing the index by which the compass is read.

By the use of the hollow bull's eye 4 the graduations and indicating data on the skirt 7 of the card 3 are considerably magnified so that the compass may be easily read. The glass 4 constitutes in effect a window through which the compass card may be seen and by employing a glass with the concave inner face which conforms more or less to the curvature of the skirt 7 the indicating data on the curved surface of the skirt will be magnified without appreciable distortion. Furthermore, a glass of this shape reduces the shadow effect on the card and gives a greater angle of visibility all of which adds to the ease with which the compass may be read.

By means of this construction it is possible to make a compass of relatively small size and yet to have the indicating data on the card easily readable.

One feature of the invention relates to novel means for adjusting the compass to compensate for deviations of the magnetic element due to local attraction. This compensating device comprises four compensating disks 21, 22, 23 and 24 which are mounted coaxially with the compass pivot. As herein shown these disks are carried by a stem 25.

The disks are made of non-magnetic material but each carries in one of its faces a bar magnet unit, which is herein shown as comprising a pair of parallel magnetic bars of equal strength. The bars in the disks 21, 22, 23 and 24 are designated 26, 27, 28 and 29 respectively. The magnetic bars of any pair have their like poles adjacent each other, that is, the north poles of the two magnetic bars carried by any disk are in adjacency. The compensating disks 21, 22, 23 and 24, which are situated one above the other, are arranged in pairs, the disks 21, 22 constituting one pair and the disks 23, 24 constituting the other pair. When the disks are in non-compensating position the magnetic bars of one disk of a pair will be in a position of opposite polarity to the magnetic bars of the other disk of the pair. In other words, in this non-compensating position the north poles of the magnets 26 of the disk 21 will be situated over the south poles of the magnets 27 of the disk 22, and similarly, the north poles of the bar magnets 28 of the disk 23 will be over the south poles of the bar magnets 29 of the disk 24. One pair of disks, for instance, the compensating disks 23, 24, are for north and south corrections, while the other pair of disks 21, 22 are for east and west corrections.

These compensating disks 21, 22, 23 and 24 are turnable about their common axis and each disk is shown as provided with holes or recesses 30 in its periphery to receive a suitable tool for turning the disk.

When the compensating disks 21, 22, 23 and 24 are in their normal or zero position the influence of each on the magnetic elements 12, 13 of the compass is neutralized by that of the other so that said magnetic elements 12 and 13 are influenced only by the magnetic attraction of the earth and, of course, so long as there is no local attraction the compass card will point due magnetic north and the reading thereon as seen through the glass 4 will give the correct direction. If, however, there is some local magnetic attraction such as would be caused by the presence of a mass of iron near the compass, the magnetic elements 12, 13 will be influenced by such local attraction and will be deviated from their correct position.

By properly adjusting the compensating disks 21, 22, 23 and 24 this error caused by local attraction can be compensated for. In making the adjustment the craft on which the compass is mounted will be headed in a known direction (for instance due north) and then the north and south disks 23, 24 will be turned in opposite directions about the stem 25 until the reading on the compass card agrees with the heading, which in this instance is due north. The direction of the craft is then shifted so that it is heading due east or west and the other compensating disks 21, 22 are then turned in opposite directions until the reading on the compass card agrees with the direction in which the craft is headed. The compass is now adjusted for some particular local attraction and will give a correct reading so long as the local attraction does not vary. Of course, if the local attraction is increased or decreased a fresh adjustment of the compass will be required.

A feature of the embodiment of the invention herein shown consists in having the compensating disks independently adjustable for while the adjustment is always made by rotating the disks of any pair in opposite directions yet a quicker or more accurate adjustment can frequently be made if one of the disks of any pair (either the north and south pair or the east and west pair) is adjusted slightly more than the other disk of the pair.

My invention provides a compass adjusting means which can be easily operated or manipulated by an unskilled person and hence the invention makes it possible for any one owning a vessel or airplane to quickly and accurately adjust his compass without calling in the services of an expert compass adjuster.

I claim:

1. In a compass, the combination with a pivoted magnetic element, of a plurality of pairs of compensating members mounted coaxially with said magnetic element, each member being adjustable about its axis independently of any other member, a pair of bar magnets carried by each compensating member, the bar magnets carried by one compensating member of a pair having a polarity opposite that of the magnets carried by the other member of said pair when said members are in non-compensating position, whereby deviation of the magnetic element of the compass may be corrected by a turning movement of the members of each pair in opposite directions.

2. In a compass, the combination with a pivoted magnetic element, of a plurality of pairs of compensating members mounted coaxially of the magnetic element, each member comprising a body of non-magnetic material and two magnetic bars supported thereby, the bars carried by each member having a polarity opposite to those carried by the other member of the pair when in non-compensating position and each member being adjustable about its axis independently of any other member.

3. A compass having a pivoted magnetic element, two pairs of compensating members mounted coaxially with the magnetic element, both members of one pair being situated above both members of the other pair, and each member being adjustable about a common axis, each compensating member comprising a disk-like body carrying a bar magnet unit, the polarity of the bar magnet unit of each compensating member of a pair of compensating members being opposite to that of the bar magnet unit of the other member of said pair when the members are in non-compensating position, whereby in such position the north pole of the bar magnet unit of each compensating member of a pair will be opposed to the south pole of the bar magnet unit of the other member of the pair.

In testimony whereof, I have signed my name to this specification.

GUSTAVE A. SALZGEBER.